United States Patent [19]
Inoue

[11] Patent Number: 5,920,019
[45] Date of Patent: Jul. 6, 1999

[54] DAMPER FOR GENERATING DAMPING FORCE VARIABLE IN DEPENDENCE ON ANGULAR POSITION OF FALL BOARD OF KEYBOARD MUSICAL INSTRUMENT

[75] Inventor: Satoshi Inoue, Hamamatsu, Japan

[73] Assignee: Yamaha Corporation, Shizuoka-ken, Japan

[21] Appl. No.: 08/861,110

[22] Filed: May 21, 1997

[30] Foreign Application Priority Data

May 28, 1996 [JP] Japan ..................................... 8-133147

[51] Int. Cl.$^6$ ....................................................... G10C 3/02
[52] U.S. Cl. ................................................................ 84/179
[58] Field of Search .......................... 84/178, 179, 423 R

[56] References Cited

U.S. PATENT DOCUMENTS 5,056,396  10/1991  Furukawa ................................... 84/179

FOREIGN PATENT DOCUMENTS 5-48238  1/1991  Japan .

*Primary Examiner*—William M. Shoop, Jr.
*Assistant Examiner*—Shih-Yung Hsieh
*Attorney, Agent, or Firm*—Hazel & Thomas

[57] ABSTRACT

An upright piano has a fall board for covering a keyboard, and a damper assembly is provided between a side arm and the fall board; the damper assembly includes a rotary damper generating large damping force during a turning motion in the counter clock wise direction and small damping force during the opposite turning motion and a link mechanism connected between the fall board and a shaft member of the rotary damper for changing the turning motion on the way between the closed position and the open position of the fall board; and a player is not expected to strongly support the fall board so as to prevent the fall board and the piano case from violent collision therebetween.

8 Claims, 4 Drawing Sheets

DAMPER FOR GENERATING DAMPING FORCE VARIABLE IN DEPENDENCE ON ANGULAR POSITION OF FALL BOARD OF KEYBOARD MUSICAL INSTRUMENT

FIELD OF THE INVENTION

This invention relates to a damper for a fall board and, more particularly, to a rotary damper for imparting a damping force in dependence on the angular position of a fall board incorporated in a keyboard musical instrument such as a piano.

DESCRIPTION OF THE RELATED ART

A keyboard musical instrument such as an acoustic piano or an electronic piano has a keyboard exposed to a player, and the player selectively fingers a score on the keyboard. However, the keyboard is usually covered with a suitable covering plate after the playing, and a fall board is a typical example of the covering plate. In the following description, term "closed position" means a position where the keyboard is covered with the fall board. On the other hand, "open position" means a position where the fall board is exposed to a player. When the center of gravity of the keyboard reaches a vertical plane usually normal to the keyboard, the fall board reaches "vertical position".

The fall board of an acoustic piano is turnable with respect to side arms provided on both sides of the keyboard, and, accordingly, is long and heavy. While the fall board is staying in the open position, it reclines on a front board of the acoustic piano. When the player draws the leading end of the fall board nearer, the fall board turns, and the keyboard is covered with the fall board. While the fall board is turning toward the keyboard, the player needs to support the weight after the vertical position so as to prevent the fall board from collision with the key slips. If the fall board slips out of the player's fingers, the fall board is violently brought into collision, and, sometimes, the fingers are hurt.

In order to prevent the fall board from the undesirable collision, a damper is usually inserted between the side arms and the fall board. For example, a rotary damper is disclosed in Japanese Utility Model Publication of Unexamined Application No. 5-48238. Oil is sealed in a stationary casing of the rotary damper. While a player is lifting the fall board from the closed position to the open position, the oil merely provides small viscous resistance, and allows the player to smoothly move the fall board. On the other hand, when the fall board is moved from the open position to the closed position, the prior art rotary damper provides large viscous resistance against the rotation of the fall board.

The prior art rotary damper encounters a problem in that a player feels the fall board to be too heavy during movement the closed position and the vertical position. The angle between the closed position and the open position is different between the piano models. A fall board incorporated in an upright piano of a manufacturer is moved over 120 degrees to 130 degrees, and a fall board of a grand piano of the same manufacturer is moved over 90 degrees. In the grand piano, the open position is substantially matched with the vertical position, and the prior art rotary damper immediately decelerates the fall board against the gravity after leaving from the open position. The player does not need to strongly support the fall board, and feels it grateful. However, if the prior art rotary damper is installed in the upright piano, the player needs to strongly draw the fall board nearer, and the prior art rotary damper provides the large damping force against player's fingers. Of course, when the fall board passes through the vertical position, the large damping force decelerates the fall board against the gravity, and the player also feels it grateful. On the other hand, when the player moves the fall board from the closed position to the open position, the prior art rotary damper can not provide a sufficient damping force against the fall board after the vertical position, and the fall board is liable to be violently brought into collision with the front board. Thus, the prior art rotary damper is not always advantageous.

SUMMARY OF THE INVENTION

It is therefore an important object of the present invention to provide a damper which provides a damping force variable depending upon the angular position of a fall board.

To accomplish the object, the present invention proposes to change a damping force at a vertical position of a fall board.

In accordance with the present invention, there is provided a damper provided between a case structure of a musical instrument with an opening and a fall board turnable between a closed position for covering the opening and an open position for exposing the opening to a person, comprising: a damping unit having a stationary member and a movable member, and generating a small damping force during a first relative motion between the stationary member in a first direction and the movable member and a large damping force during a relative second motion between the stationary member and the movable member in a second direction opposite to the first direction; and a motion changing mechanism connected between the fall board and the damping unit, and changing the damping unit from the first relative motion to the second relative motion at an intermediate position of the fall board on the way from the closed position to the open position and on the way from the open position to the closed position.

BRIEF DESCRIPTION OF THE DRAWINGS

The features and advantages of the damper according to the present invention will be more clearly understood from the following description taken in conjunction with the accompanying drawings in which.

DESCRIPTION OF THE PREFERRED EMBODIMENTS

First Embodiment

Figure 1:
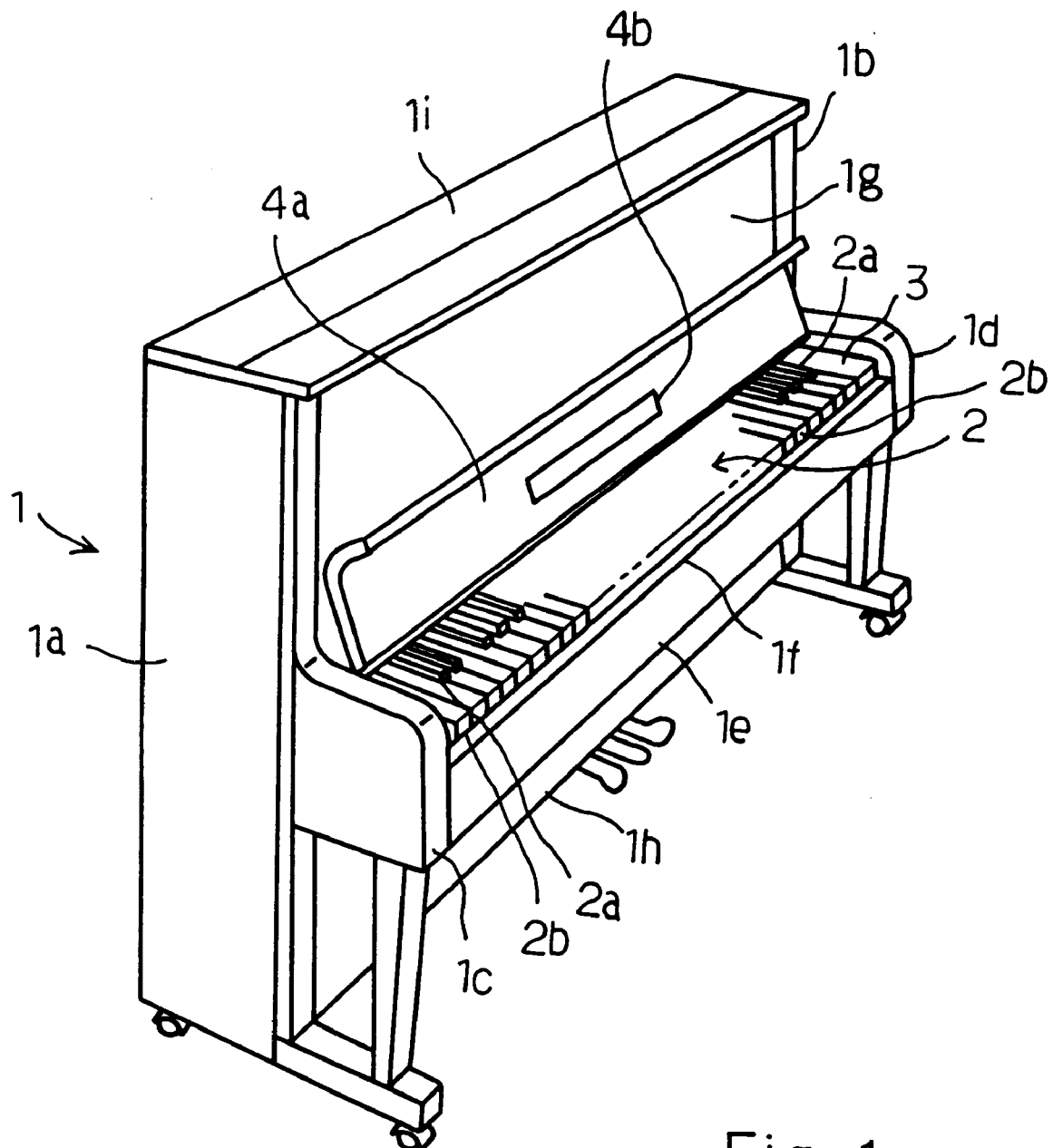
FIG. 1 is a perspective view showing an upright piano equipped with a damper according to the present invention.

Referring to FIG. 1 of the drawings, an upright piano comprises a piano case 1, and a pair of side boards 1a/1b, a pair of side arms 1c/1d, a key bed 1e, a key slip 1f, an upper front board 1g, a lower front board 1h, a top board 1i and a bottom board (not shown) form parts of the piano case. The top board 1i, the upper/lower front boards 1g/1h and the bottom board laterally extend between the side boards 1a and 1b, and the side arms 1c/1d project from the side boards 1a/1b, respectively. The key bed 1e also projects from the pair of side boards 1a/1b, and the key slip if extends between the side arms 1c and 1d.

The upright piano further comprises a keyboard 2 and a pair of key blocks 3, and a plurality of black keys 2a and a plurality of white keys 2b form in combination the keyboard 2. In this instance, eighty-eight black and white keys 2a/2b are incorporated in the keyboard 2. The keyboard 2 is mounted on the key bed 1e, and the key blocks 3 are placed between the side arms 1c/1d and the keyboard 2. Though not shown in FIG. 1, a plurality of key action mechanisms, a plurality of hammer assemblies, a plurality of damper mechanisms and a plurality of sets of strings are provided inside of the piano case 1. The key action mechanisms, the hammer assemblies and the damper mechanisms cooperate with the black and white keys 2a/2b, and produce acoustic piano tones through the vibrations of the strings as well known to a person skilled in the art.

Figure 2:
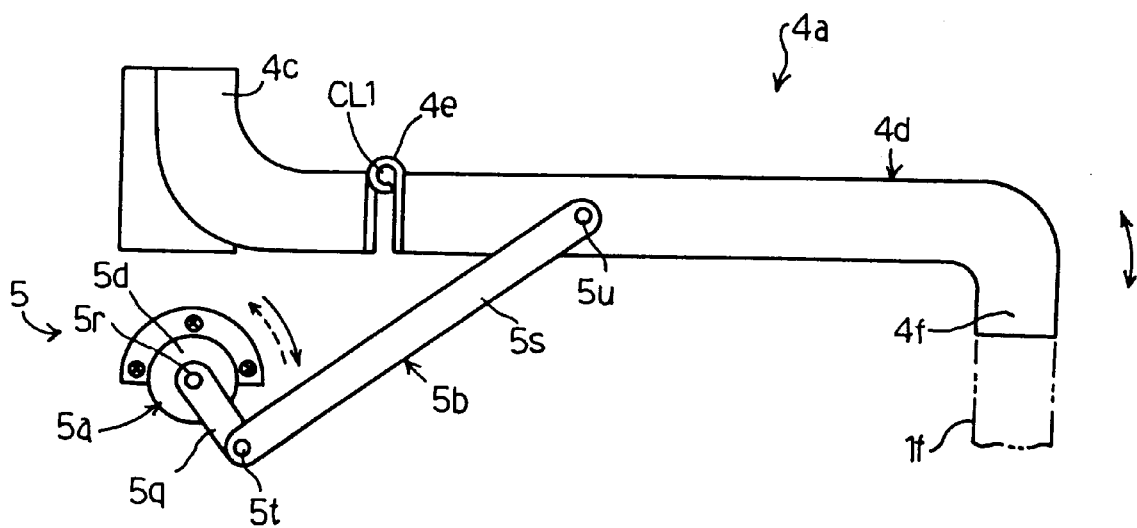
FIG. 2 is a side view showing a rotary damper linked with a fall board of the upright piano.

The upright piano further comprises a fall board 4a, and a music rack 4b is attached to an inner surface of the fall board 4b. As will be shown in FIG. 2, the fall board is split into a rear board 4c and a front lid 4d, and the rear board 4c is connected through a hinge 4e to the front lid 4d. The rear board 4c is fixed to parts of the piano case 1 such as the side arms 1c/1d, and is stationary to the piano case 1. On the other hand, the front lid 4d is turnable, and the hinge 4e provides a center CL1 of the rotation. The leading end 4f of the front lid 4d is in contact with the key slip 1f during the closed position as shown in FIG. 2, and turns over 120 degrees. When the front lid 4d reaches the open position, the leading end portion is brought into contact with the upper front board 1g. The front lid 4d reclines on the upper front board 1g in the open position, and is supported by the upper front board 1g.

The upright piano 1 further comprises a pair of damper assemblies 5 provided between the pair of side arms 1c/1d and the front lid 4d. The damper assemblies 5 are similar to each other, and only one of the damper assemblies is hereinbelow described in detail.

The damper assembly 5 includes a rotary damper 5a embedded in the side arm 1c/1d and link mechanism 5b connected between the rotary damper 5a and the front lip 5b.

Figure 3:
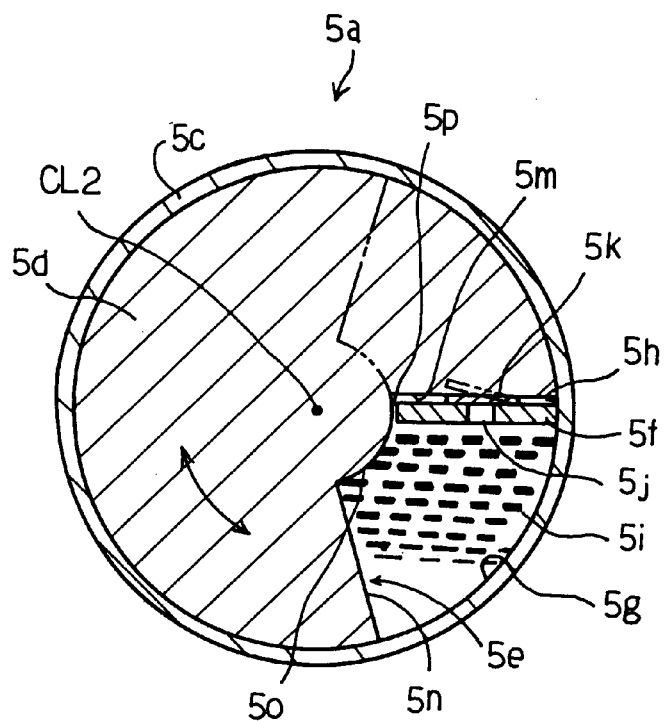
FIG. 3 is a cross sectional view showing the internal structure of the rotary damper.

As shown in FIG. 3, the rotary damper 5a has a cylindrical case 5c embedded in the side arm 1c/1d and a shaft member 5d inserted into the inner space of the cylindrical case 5c. An end portion of the shaft member 5d projects from the cylindrical case 5c, and is fixed to the link mechanism 5b. The shaft member 5d is partially cut away so as to form a u-letter shaped groove 5e, and a partition wall 5f inwardly projects from the inner surface of the cylindrical case 5c. The inner surface of the cylindrical case 5c, the partition wall 5f and the surface defining the u-letter shaped groove 5e define two chambers 5g/5h. The shaft member 5d is rotatable in the cylindrical case 5c around a center axis CL2 thereof, and the volumes of the chambers 5g/5h are variable depending upon the angular position of the shaft member 5d.

A through-hole 5j is formed in the partition wall 5f, and are open to both of the chambers 5g/5h. The chambers 5g/5h are filled with incompressible fluid such as damping oil 5i. A check valve 5k is provided on the surface of the partition wall 5f exposed to the chamber 5h, and allows the damping oil 5i to flow from the chamber 5g to the chamber 5h. However, the check valve 5k blocks the chamber 5g from the damping oil 5i flowing thereinto.

The inner end of the partition wall 5f is slightly spaced from the bottom surface 5o of the shaft member 5d, and the bottom surface 5o and the inner end of the partition wall 5f define a throttle 5p. The damping oil is allowed to flow between the chambers 5g/5h through the throttle 5p. The throttle 5p provides the resistance against the damping oil 5i larger than the through hole 5j. However, when the check valve closes the through hole 5j, the shaft member 5d forces the damping oil 5i to pass through the throttle 5p against the large resistance.

When the fall board 4a is in the closed position, the vertical surface 5m is as close to the partition wall 5f as possible as shown in FIG. 5a, and most of the damping oil 5i is stored in the chamber 5g. On the other hand, when the fall board 4a is in the open position, the vertical surface 5n is as close to the partition wall 5f as possible, and most of the damping oil 5i stays in the other chamber 5h.

Turning back to FIG. 2, the link mechanism 5b has a short arm member 5q connected to the shaft member 5d by means of a pin 5r and a long arm member 5s connected between the short arm member 5q and the front lid 4d by means of pins 5t/5u. While the front lid 4d is turning between the closed position and the open position, the link mechanism 5b rotates the shaft member 5d in one direction until the vertical position, and causes the shaft member 5b to turn in the opposite direction after the vertical position. Thus, the link mechanism 5b changes the rotating direction of the shaft member 5d at the vertical position of the fall board 4a.

Figure 4:
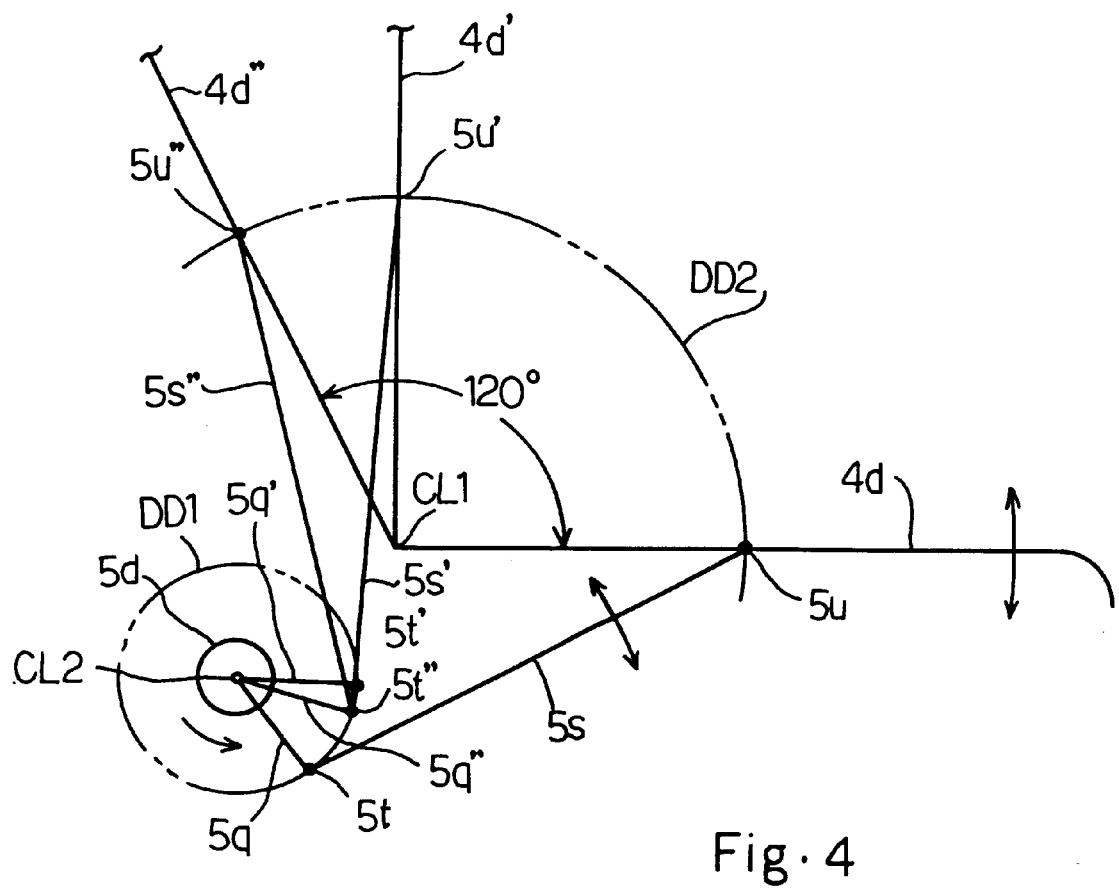
FIG. 4 is a view showing the behavior of the rotary damper, the link mechanism and the fall board.

FIG. 4 illustrates the behavior of the damper assembly 5a. The shaft member 5d, the short arm member 5q and the long arm member 5s are rotated around the center line CL2, also the center line CL2 and the pin member 5t, respectively, and the pin members 5t and 5u are moved along dots-and-dash lines DD1 and DD2, respectively. As described hereinbefore, the fall board 4d turns over 120 degrees.

When the front lid 4d is staying at the closed position, the front lid 4d is substantially horizontal, and references 5q and 5s are representative of the short arm member and the long arm member, respectively. The front lid 4d is assumed to be rotated in the counter clockwise direction from the closed position. The long arm member 5s pulls the pin member 5t, and causes the shaft member 5d to turn in the counter clock wise direction. While the shaft member 5d is rotating in the counter clockwise direction from the closed position toward the vertical position, the vertical surface 5n presses the damping oil 5i, and the damping oil 5i flows from the chamber 5g through the through-hole 5j into the other chamber 5h. The check valve 5k does not serve as an obstacle against the damping oil 5i. For this reason, the rotary damper 5a is smoothly rotated, and the player feels the front lid 4d light.

When the front lid reaches the vertical position 4d', the long arm member, the short arm member and the pin members arrive at respective intermediate positions 5s', 5q', 5t'/5u'. The front lid 4d continues to turn toward the open position, and the long arm member 5s pushes the short arm member 5q. The shaft member 5d turns in the clockwise direction. Thus, the shaft member 5d changes the rotating motion from the counter clockwise direction to the clockwise direction. The vertical surface 5m presses the damping oil 5i, and forces the damping oil 5i to flow from the chamber 5h to the chamber 5g. The check valve 5k closes the through-hole 5j, and the damping oil 5i passes through the throttle 5p. The damping oil 5i and, accordingly, the shaft member 5d encounter large resistance, and provide large damping force to the front lid 4d. As a result, the front lid 4d is gently brought into contact with the upper front board 1g. The front lid, the long arm member, the short arm member and the pin members arrive at respective open positions 4d", 5s", 5q", 5u" and 5t", respectively.

On the other hand, when the player covers the keyboard 2 with the front lid 4d, the player pulls the front lid 4d. While the front lid 4d is turning from the open position 4d" to the vertical position 4d', the long arm member 5s pulls the short arm member 5q, and the shaft member 5d turns in the counter clockwise direction. The shaft member 5d forces the damping oil 5i to flow from the chamber 5g through the through-hole 5j to the other chamber 5h, and the resistance is small. For this reason, the player feels the front lid 4d light.

While the front lid 4d is turning from the vertical position 4d' to the closed position, the long arm member 5s pushes the short arm member 5q, and the shaft member 5d turns in the clockwise direction. The check valve closes the through-hole 5j, and the shaft member 5d forces the damping oil 5i to flow through the throttle 5p. The rotary damper 5a provides large damping force against the front lid 4d, and causes the front lid 4d to gently land on the key slip 1f. In other words, the player does not need to strongly support the front lid 4d.

In this instance, the rotary damper 5a and the link mechanism 5b serve as a damping unit and a motion changing mechanism, respectively. The through-hole 5j, the check valve 5k and the throttle 5p as a whole constitute a flow resistance controller.

As will be appreciated from the foregoing description, the damper assembly 5 according to the present invention changes the damping force depending upon the angular position of the fall board, and the player feels the damper assembly 5 grateful at all times.

Second Embodiment

Figure 5:
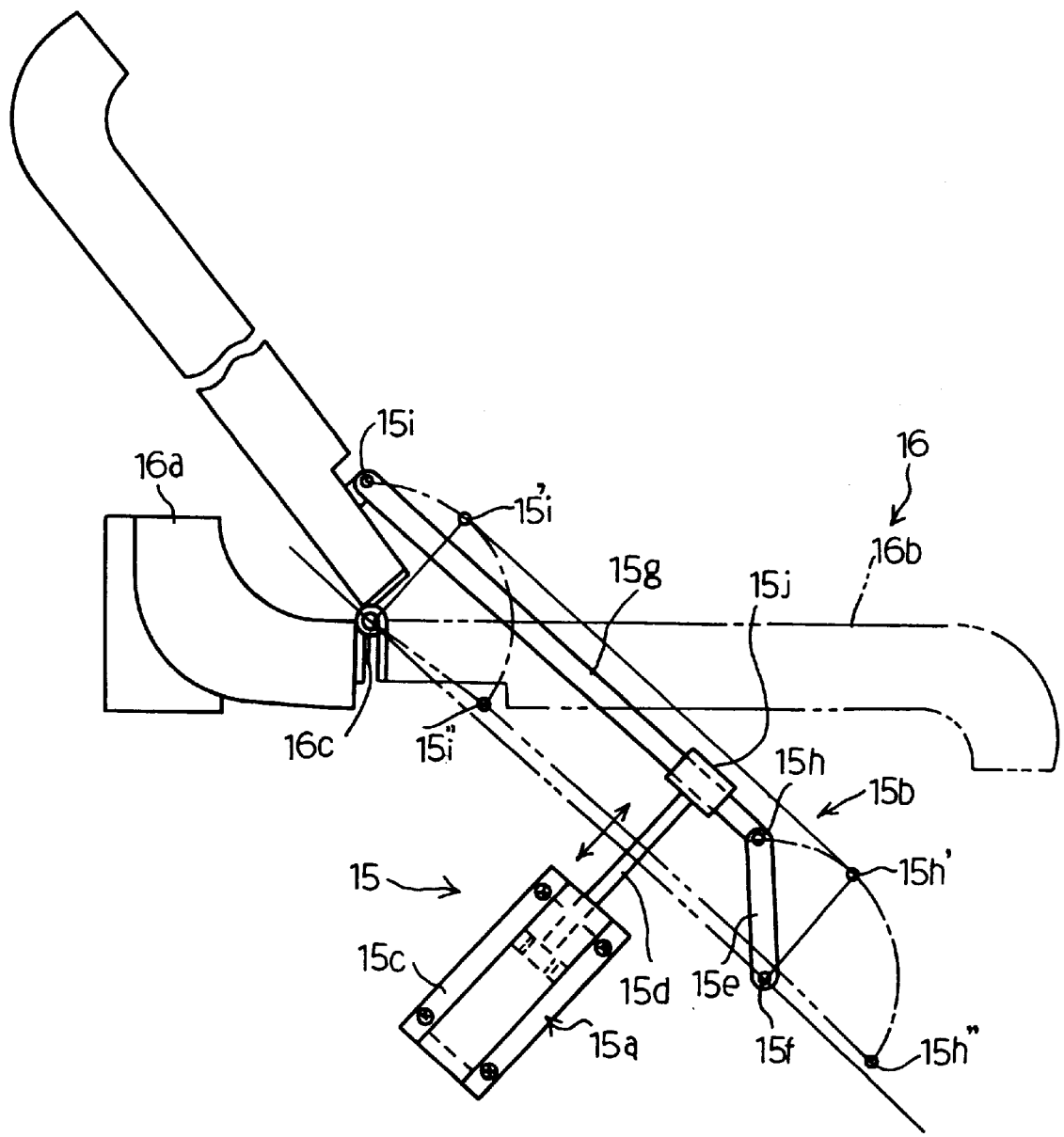
FIG. 5 is a side view showing a fall board associated with another damper unit according to the present invention.

FIG. 5 illustrates another damper assembly 15 inserted between a fall board 16 and a side arm (not shown). The side arm forms a part of a piano case which in turn forms a part of an upright piano. The fall board 16 is split into a stationary rear board 16a and a turnable front lid 16b, and a hinge 16c is connected between the rear board 16a and the front lid 16b.

The damper assembly 15 comprises a linear damper 15a and a link mechanism 15b. The linear damper 15a includes a cylinder case 15c and a rod member 15d reciprocally moved in the cylindrical case 15c. The inner surface of the cylindrical case 15c and the rod member 15d define two chambers, and the two chambers are filled with incompressible fluid such as the damping oil. The rod member 15d pushes the damping oil so as to flow between the two chambers, and a fluid resistance controller is provided inside of the cylindrical case 15c. While the rod member 15d is being retracted, the fluid resistance controller causes the damping oil to produce large resistance against the rod member 15d. On the other hand, the fluid resistance controller causes the damping oil to produce small resistance during a projection of the rod member 15d from the cylindrical case 15c. The fluid resistance controller may be implemented by two through holes formed in the rod member and a check valve for closing one of the through holes.

The link mechanism 15b has a short arm member 15e turnable around a pin member 15f fixed to the side arm and a long arm member 15g connected between the short arm member 15e and the front lid 16b by means of pin members 15h/15i. The long arm member 15g is substantially in parallel to a line between the hinge 16c and the pin member 15f. A slider 15h is fixed to the leading end of the rod member 15d, and is slidably engaged with the long arm member 15g.

The hinge 16c and the pin members 15f, 15h and 15i are placed at four corners of a virtual parallelogram. When the front lid 16b is in the closed position, the virtual parallelogram minimizes the height, and the pin members 15i and 15h are at points 15i" and 15h", respectively. While the front lid 16b is turning between the closed position and the open position, the pin members 15i and 15h passes through points 15i' and 15h' at the vertical position of the front lid 16b, and the virtual parallelogram maximizes the height.

The rod member 15d projects from the cylindrical case 15c from the closed position to the vertical position, and is retracted into the cylindrical case 15c from the vertical position to the open position. A person feels the front lid 16b light from the closed position to the vertical position, and the damper assembly 15 provides large resistance against the turning motion from the vertical position to the open position so as to gently land on the upper front board.

When the front lid 16b is turning from the open position through the vertical position to the closed position, the rod member 15d firstly projects, and is retracted after passing through the vertical position. As a result, the front lid 16b turns without a substantial resistance from the open position to the vertical position, and the damper assembly 15 provides the large resistance against the turning motion from the vertical position to the closed position.

Thus, the damper assembly 15 changes the magnitude of the damping force depending upon the angular position of the front lid 16b, and a player feels the damper assembly 15 grateful at all times.

Although particular embodiments of the present invention have been shown and described, it will be obvious to those skilled in the art that various changes and modifications may be made without departing from the spirit and scope of the present invention.

For example, a fall board may be associated with only one damping assembly inserted between one side surface of the fall board and a side arm.

The rotary damper or the linear damper may be attached to the fall board, and the link mechanism may be connected between the damper and a stationary member of a piano.

If the fall board is light, the air may flow between the chambers of the rotary/linear damper.

Figure 6:
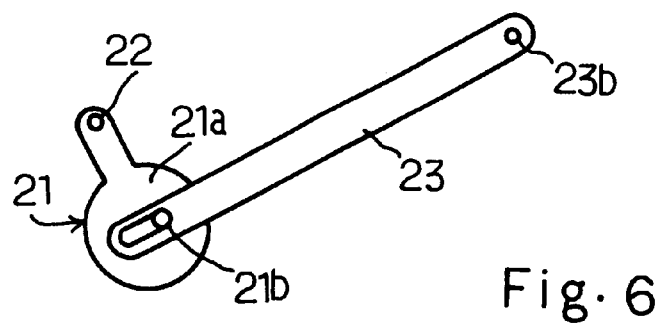
FIG. 6 is a side view showing yet another rotary damper and a link mechanism according to the present invention.

As shown in FIG. 6, a case member 21a of a rotary damper 21 may be connected through a shaft member 22 to a piano case (not shown). In this instance, a shaft member 21b is loosely connected to an arm member 23, and a fall board (not shown) is connected to the other end of the arm member 23 by means of a pin member 23b.

The damper assembly according to the present invention may be used for a grand piano, an electric/electronic piano or an electronic keyboard musical instrument.

The damper assembly may be connected between a piano case and a fall board which turns over a certain angle greater than or less than 120 degrees.

What is claimed is:

1. A damper provided between a case structure of a musical instrument with an opening and a fall board turnable between a closed position for covering said opening and an open position for exposing said opening to a person, comprising:

a damping unit having a stationary member and a movable member, and generating a small damping force during a first relative motion between said stationary member in a first direction and said movable member and a large damping force during a relative second motion between said stationary member and said movable member in a second direction opposite to said first direction; and a motion changing mechanism connected between said fall board and said damping unit, for changing a rotation direction of said damping unit between said first relative motion to said second relative motion at an intermediate position of said fall board on the way from said closed position to said open position and on the way from said open position to said closed position.

2. The damper as set forth in claim 1, in which said damping unit includes a case member having a hollow space inside thereof and connected to one of said case structure and said fall board, a rotatable shaft member connected to said motion changing mechanism, accommodated in said hollow space and defining a first chamber and a second chamber together with said case member, a fluid filling said first chamber and said second chamber, and a flow resistance controller provided between said first chamber and said second chamber and providing a small resistance against said fluid flowing from said first chamber to said second chamber during said first relative motion and a large resistance against said fluid flowing from said second chamber to said first chamber during said second relative motion.

3. The damper as set forth in claim 2, in which said flow resistance controller has a partition wall member fixed to said case member and having a through hole open to said first chamber and said second chamber, a check valve attached to said partition wall member and closing said through hole when said fluid flows from said second chamber to said first chamber, and a throttle defining between said partition wall and said rotatable shaft member and allowing said fluid to flow between said first chamber and said second chamber.

4. The damper as set forth in claim 1, in which said case structure is a piano case supporting a keyboard exposed to said opening.

5. The damper as set forth in claim 4, in which said piano case forms a part of an upright piano.

6. A damper provided between a case structure of a musical instrument with an opening and a fall board turnable between a closed position for covering said opening and an open position for exposing said opening to a person, comprising:

a damping unit having a stationary member and a movable member, generating a small damping force during a first relative motion between said stationary member in a first direction and said movable member and a large damping force during a relative second motion between said stationary member and said movable member in a second direction opposite to said first direction, ;and including a case member having a hollow space inside thereof and connected to one of said case structure and said fall board, a rotatable shaft member accommodated in said hollow space and defining a first chamber and a second chamber together with said case member, a fluid filling said first chamber and said second chamber and a flow resistance controller provided between said first chamber and said second chamber and providing a small resistance against said fluid flowing from said first chamber to said second chamber during said first relative motion and a large resistance against said fluid flowing from said second chamber to said first chamber during said second relative motion a motion changing mechanism connected between said fall board and said rotatable shaft member of said damping unit, and changing said damping unit from said first relative motion to said second relative motion at an intermediate position of said fall board on the way from said closed position to said open position and on the way from said open position to said closed position, and including a first link fixed to said rotatable shaft member, and a second link turnably connected at one end thereof to said first link and at the other end thereof to said fall board, said fall board at said intermediate position causing said other end of said second link to reach the farthest point from a center line of said rotatable shaft member.

7. A damper provided between a case structure of a musical instrument with an opening and a fall board turnable between a closed position for covering said opening and an open position for exposing said opening to a person, comprising:

a damping unit including a cylinder serving as a stationary member and having a hollow space and connected to one of said case structure and said fall board, a rod member serving as a movable member, slidably inserted into said hollow space and defining a first chamber and a second chamber together with said cylinder, a fluid filling said first chamber and said second chamber, and a fluid resistance controller provided between said first chamber and said second chamber and providing a small resistance against said fluid flowing from said first chamber to said second chamber during said first relative motion and a large resistance against said fluid flowing from said second chamber to said first chamber during said second relative motion for generating a small damping force during a first relative motion between said stationary member in a first direction and said movable member and a large damping force during a relative second motion between said stationary member and said movable member in a second direction opposite to said first direction; and a motion changing mechanism connected between said fall board and said rod member of said damping unit, and changing said damping unit from said first relative motion to said second relative motion at an intermediate position of said fall board on the way from said closed position to said open position and on the way from said open position to said closed position.

8. The damper as set forth in claim 5, in which said motion changing mechanism includes a first link turnably connected to said one of said case structure and said fall board, a second link turnably connected at one end thereof to said first link and at the other end thereof to the other of said case structure and said fall board, and a slider connected to said rod member and slidable along said second link, said first and second links causing said slider to arrive at the farthest point from said cylinder when said fall board arrives at said intermediate position.

* * * * *